(12) United States Patent
Mandler

(10) Patent No.: US 7,392,346 B2
(45) Date of Patent: Jun. 24, 2008

(54) MEMORY UPDATER USING A CONTROL ARRAY TO DEFER MEMORY OPERATIONS

(75) Inventor: Alberto Rodrigo Mandler, Rehovot (IL)

(73) Assignee: Analog Devices, Inc., Norwood, MA (US)

(*) Notice: Subject to any disclaimer, the term of this patent is extended or adjusted under 35 U.S.C. 154(b) by 0 days.

(21) Appl. No.: 11/647,555

(22) Filed: Dec. 28, 2006

(65) Prior Publication Data

US 2007/0124539 A1    May 31, 2007

Related U.S. Application Data

(63) Continuation of application No. 10/742,720, filed on Dec. 19, 2003, now abandoned.

(51) Int. Cl.
*G06F 12/00* (2006.01)
*G06F 12/14* (2006.01)
*G06F 11/00* (2006.01)
*G09F 12/16* (2006.01)

(52) U.S. Cl. .................... 711/128; 711/121; 711/146; 711/150; 711/151; 711/154; 711/155; 711/165; 711/170; 714/6

(58) Field of Classification Search ................. None
See application file for complete search history.

(56) References Cited

U.S. PATENT DOCUMENTS 5,353,410 A * 10/1994 Macon et al. ............... 711/144
6,434,669 B1 * 8/2002 Arimilli et al. ............. 711/128
2002/0129211 A1 * 9/2002 Arimilli et al. ............. 711/146

* cited by examiner

*Primary Examiner*—Hyung S Sough
*Assistant Examiner*—Mardochee Chery
(74) *Attorney, Agent, or Firm*—Wolf, Greenfield & Sacks, P.C.

(57) ABSTRACT

A memory having multiple locations for data storage is updated by performing the following method. The memory locations are grouped into commonly accessible groups of one or more data locations. First, a control array is provided. The control array is associated with a predetermined type of memory update operation, and has a local indicator for each commonly accessible group of memory locations respectively. Next, the instruction stream to the memory is monitored to determine the current memory operation type, and the set of groups of memory locations upon which the current operation is to be performed. If the current memory operation is an operation of the predetermined type, the control array is updated. If the current operation is an operation other than the predetermined type, the state of the respective local indicator of each group of the set is determined. The current operation is then performed upon each group in the set in accordance with the state of its respective local indicator. Embodiments permit following instructions to be processed as if the deferred memory operation were performed in a single cycle, even before the memory itself is updated.

8 Claims, 10 Drawing Sheets

|  | WAY 1 | | | | | WAY 2 | | | | |
|---|---|---|---|---|---|---|---|---|---|---|
| ROW | Data | Control | | | | Data | Control | | | |
| | | Tag | Dirty | Valid | Other | | Tag | Dirty | Valid | Other |
| 1 | | | | | | | | | | |
| 2 | | | | | | | | | | |
| 3 | | | | | | | | | | |
| 4 | | | | | | | | | | |
| ⋮ | | | | | | | | | | |
| M | | | | | | | | | | |

Figure 1 – Prior art

MEMORY UPDATER USING A CONTROL ARRAY TO DEFER MEMORY OPERATIONS

FIELD AND BACKGROUND OF THE INVENTION

The present embodiments relate to performing update operations to a memory and, more particularly, to performing large-scale update operations to a memory.

Data access speed is a crucial parameter in the performance of many digital systems, and in particular in systems such as digital signal processors (DSPs) which perform high-speed processing of real-time data. Many types of memories and memory access methods have been developed with the goal of improving memory access speed. While the access speed to individual memory locations has increased, writing large blocks of data to memory remains problematic. Power considerations limit the number of memory locations which can be updated simultaneously, so that writing to numerous locations in a memory requires many write cycles, and incurs a significant time overhead.

Memory caching is a widespread technique used to improve data access speed in computers and other digital systems. Cache memories are small, fast memories holding recently accessed data and instructions. Caching relies on a property of memory access known as temporal locality. Temporal locality states that information recently accessed from memory is likely to be accessed again soon, and that information close to that recently accessed is likely to be accessed soon. When an item stored in main memory is required, the processor first checks the cache to determine if the required data or instruction is there. If so, the data is loaded directly from the cache instead of from the slower main memory, with very little delay. Due to temporal locality a relatively small cache memory can significantly speed up memory accesses for most programs.

When new data is to be written to the cache, a decision is made using a cache mapping strategy to determine where within the cache to write the new data. There are currently three prevalent mapping strategies for cache memories: the direct mapped cache, the fully associative cache, and the n-way set associative cache. In the direct mapped cache, a portion of the main memory address of the data, known as the index, completely determines the location in which the data is cached. The remaining portion of the address, known as the tag, is stored in the cache along with the data. To check if required data is stored in the cached memory, the processor compares the main memory address of the required data to the main memory address of the cached data. As the skilled person will appreciate, the main memory address of the cached data is generally determined from the tag stored in the location required by the index of the required data. If a correspondence is found, the data is retrieved from the cache memory, and a main memory access is prevented. Otherwise, the data is accessed from the main memory. The drawback of the direct mapped cache is that the data replacement rate in the cache is generally high, since the way in which main memory data is cached is completely determined by the main memory address of the data. There is no leeway for alleviating contention for the same memory location by multiple data items, and for maintaining often-required data within the cache. The effectiveness of the cache is thus reduced.

The opposite policy is implemented by the fully associative cache, in which the cache is arranged in rows and cached information can be stored in any row. The fully associative cache alleviates the problem of contention for cache locations, since data need only be replaced when the whole cache is full. In the fully associative cache, however, when the processor checks the cache memory for required data, every row of the cache must be checked against the address of the data. To minimize the time required for this operation, all rows are checked in parallel, requiring a significant amount of extra hardware.

The n-way set associative cache memory is a compromise between the direct mapped cache and the fully associative cache. Like the direct mapped cache, in a set-associative cache the cache is arranged in rows and the index of the address is used to select a row of the cache memory. However, in the n-way set associative cache each row contains n separate ways. Each way can store the tag, data, and any indicators required for cache management and control. For example, each way typically contains a validity bit which indicates whether the way contains valid or invalid data. Thus, if a way containing invalid data happens to give a cache hit, the data will be recognized as invalid and ignored, and no processing error will occur. In an n-way set associative cache, the main memory address of the required data need only be checked against the address associated with the data in each of the n ways of the corresponding row, to determine if the data is cached. The n-way set associative cache reduces the data replacement rate (as compared to the direct mapped cache) because data in addresses corresponding to the row can be stored in any of the ways in the row that are still available. As a further possibility, if all of the ways in the row are full, but some contain data that is less likely to be needed, then the new data can replace the data least likely to be needed. Such a system requires only a moderate increase in hardware.

Cache memories store both memory data and control data. Reference is now made to FIG. 1, which shows an example of the data and control arrays for a 2-way set associative memory. The associative memory is organized into M rows, where the number of rows is determined by general hardware design considerations. Each of the M rows contains two ways, although in the general case of an n-way set associative memory, each row would have n ways. As described above, each way stores main memory data. Each way additionally stores control data including a tag (which together the row index determines the main memory address of the stored data in a given way), and indicator flags, such as the validity bit, lock bit, and any other required indicators. Additional control data may also be stored on a per index basis, or for a block of indices.

As with standard memories, cache memories suffer from speed problems when a large quantity of data is updated in the cache. In cache memories write accesses may be made to both memory data and control data. Cache management functions often require performing control operations on large portions of the cache. For example, during cache reset the data is invalidated for every way in the cache. The number of write cycles required to reset the cache depends on the write access width to the cache. If the write access width enables writing to an entire index in a single cycle, the number of write cycles required to reset the cache equals the number of indices in the cache memory. However, if the write access width is a single way, the number of write cycles required to invalidate an entire index equals the number of ways in the cache memory (which for an n-way set associative cache equals n times the number of indices).

Memory access speeds are a crucial factor in the performance of many systems. Modifying the data in a large number of memory locations is generally a time-consuming operation, since the number of memory locations which can be updated simultaneously is generally limited by power considerations and the data access width. In order to initialize a block of memory, for example, the required value is stored in each memory location in the block, which may require many write cycles. During the initialization process access to the memory is generally blocked, to ensure that no data is read from a memory location before its data has been brought up-to-date. The resulting delays are particularly problematic in cache memories, since updates to multiple data items occur relatively frequently.

There is thus a widely recognized need for, and it would be highly advantageous to have, a memory update technique devoid of the above limitations.

SUMMARY OF THE INVENTION

According to a first aspect of the present invention there is provided a method for updating a memory having multiple locations for data storage. The memory locations are grouped into commonly accessible groups of one or more data locations. First, a control array is provided. The control array is associated with a predetermined type of memory update operation, and has a local indicator for each commonly accessible group of memory locations respectively. Next, the instruction stream to the memory is monitored to determine the current memory operation type, and the set of groups of memory locations upon which the current operation is to be performed. If the current memory operation is an operation of the predetermined type, the control array is updated. If the current operation is an operation other than the predetermined type, the state of the respective indicator of each group of the set is determined. The current operation is then performed upon each group in the set in accordance with the state of its respective indicator.

According to a second aspect of the present invention there is provided a memory updater, consisting of: a control array, an instruction monitor, a control array updater, a state determiner, and a memory writer. The control array is associated with a predetermined type of memory write operation, and has a local indicator for each commonly accessible group of memory locations of a memory respectively. The instruction monitor monitors an instruction stream to the memory, and determines the current memory operation type and a set of groups upon which the current operation is to be performed. The control array updater updates the control array when the current operation is of the predetermined type. The state determiner determines the state of the respective local indicator of each group of the set from the control array. The memory writer implements memory write operations which are not of the predetermined operation type, by updating each group of the set of groups in accordance with the state of the group's respective local indicator of the group, and by performing the current operation upon the updated groups.

According to a third aspect of the present invention there is provided a method for updating a memory having multiple locations for data storage. The memory locations are grouped into commonly accessible groups of one or more data locations. First, a control array is provided. The control array is associated with a predetermined type of memory update operation, and has a local indicator for each commonly accessible group of memory locations respectively. Next, a pending array is provided, having a pending flag for each of the local indicators respectively. The local indicators are grouped, and a global array having a global indicator for each group of local indicators respectively is provided. The instruction stream to the memory is then monitored to determine the current memory operation type, and the set of groups of memory locations upon which the current operation is to be performed. If the current memory operation is an operation of the predetermined type, a decision is made whether the operation is to be implemented as a global update using the global indicators, or as a local update using the local indicators. If a local update is selected, the control array is updated. If a global update is selected, the following steps are performed. First the global array is updated. Next the local indicator associated with each of the global indicators is updated in accordance with the state of the associated global indicator and the respective pending flag. The respective pending flag is then cleared. After all the local indicators associated with a global indicator are updated, the global indicator is cleared.

If the current operation is an operation other than the predetermined type, a combined state of each group of the set is determined. The combined set contains the states of the group's respective local indicator, respective pending flag, and associated global indicator. The current operation is then performed upon each group in the set in accordance with the group's combined state.

The present invention successfully addresses the shortcomings of the presently known configurations by providing a method for updating multiple memory locations by storing update information in a relatively small control array, and performing the memory update to each of the memory locations during subsequent routine write operations to memory.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 illustrates the organization of a standard 2-way set associative memory.

DESCRIPTION OF THE PREFERRED EMBODIMENTS

Figure 2A:
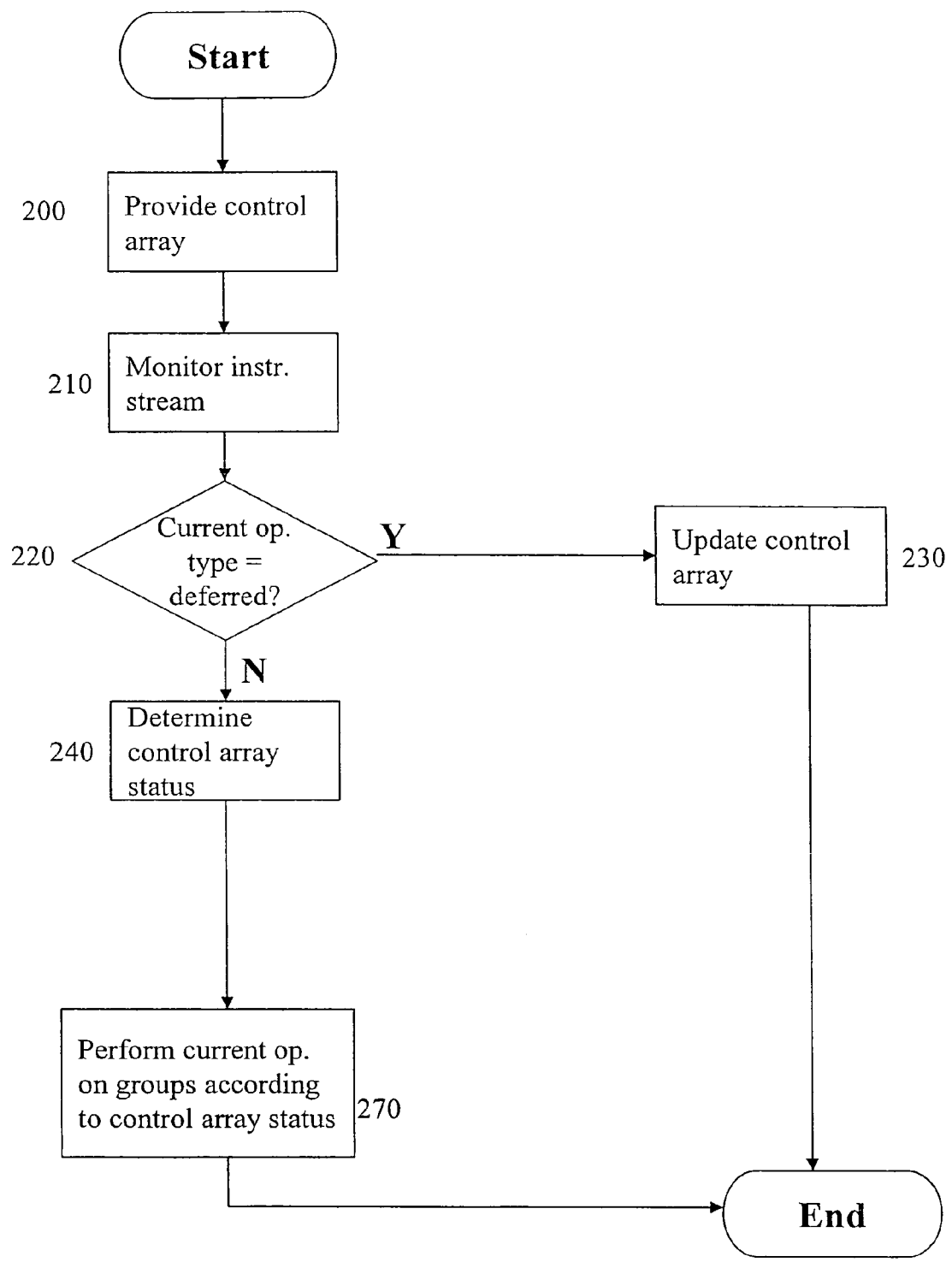
FIG. 2a is a simplified flowchart of a method for updating a memory, according to a preferred embodiment of the present invention.

The present embodiments are of a memory update method and apparatus which can reduce the number of memory access cycles required to update blocks of memory. Specifically, when a memory operation is performed to a block of memory, rather than immediately dedicating several update cycles to updating all of the data locations in the block, the updating of memory data is postponed until each location is written to during a subsequent update operation. Although the data is not updated in the memory immediately, subsequent memory operations can be performed as if the memory data is current. Thus the memory update operation is effectively performed in fewer processor cycles than would otherwise be required.

The embodiments described below utilize a control array to facilitate a memory update operation. The control array is associated with a particular, preselected type of update operation. When a memory access operation is of the preselected type, the operation is performed by updating only the control array. No data access is performed to the memory itself. Since the control array is small relative to the memory itself, the number of cycles required to update the control array is fewer than the number that would be required to update the memory directly, and may be as few as a single update cycle. Thus the time and power devoted to updating large areas of memory may be significantly reduced.

The principles and operation of a memory update method and apparatus according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The preferred embodiments described below are applicable to any memory in which several data locations are simultaneously updatable during a single update cycle. FIGS. 2-6 are directed at an n-way set associative cache memory. The present method and apparatus, however, are not limited to a memory organized as an n-way set associative cache. The memory may have a different mapping strategy, such as a standard directly addressable memory, a direct mapped cache, or a fully associative cache.

Figure 2B:
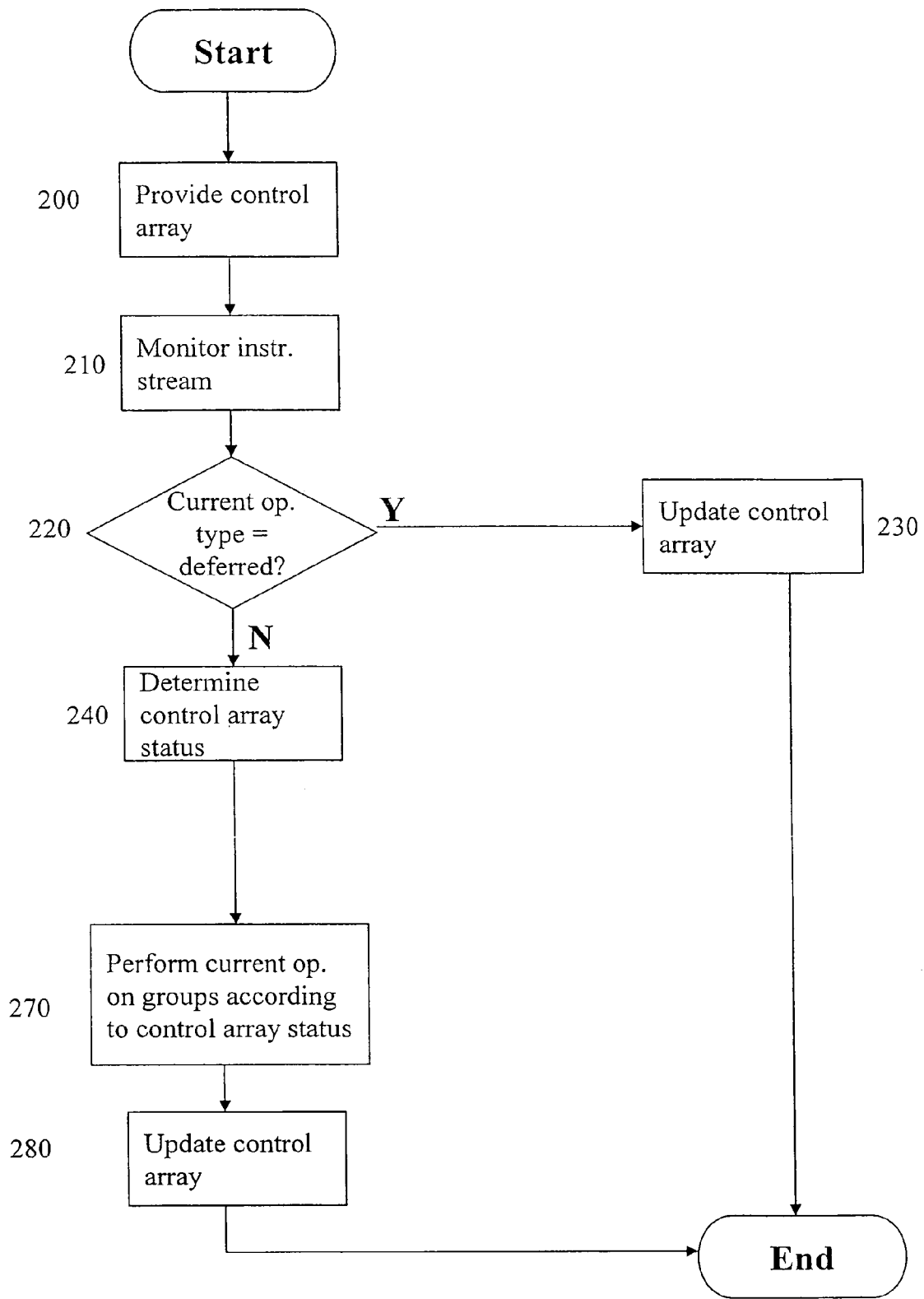
FIG. 2b is a simplified flowchart of a further method for updating a memory, according to a preferred embodiment of the present invention.
Figure 2C:
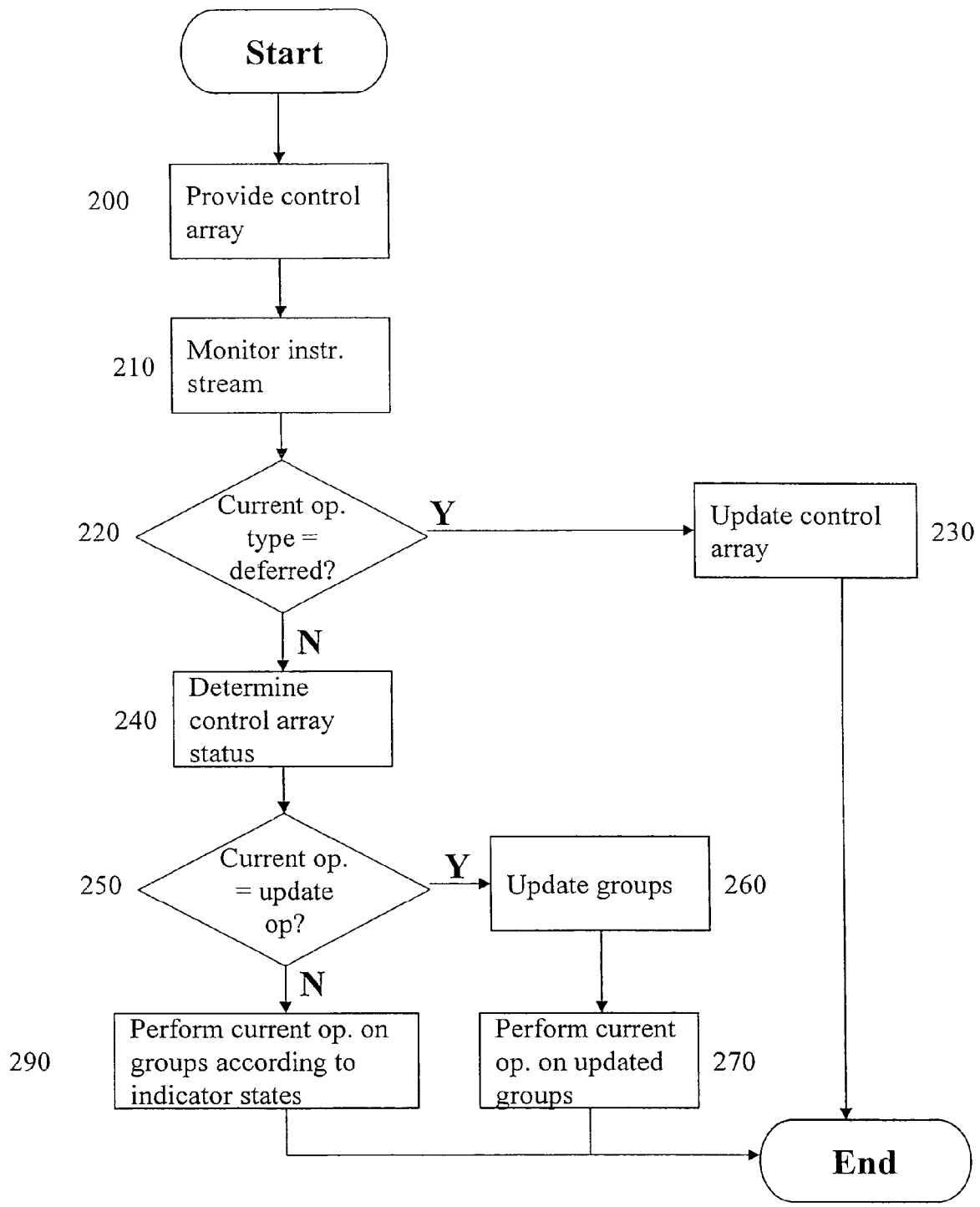
FIG. 2c is a simplified flowchart of a method for performing read and update operations to a memory, according to a preferred embodiment of the current invention.
Figure 3A:
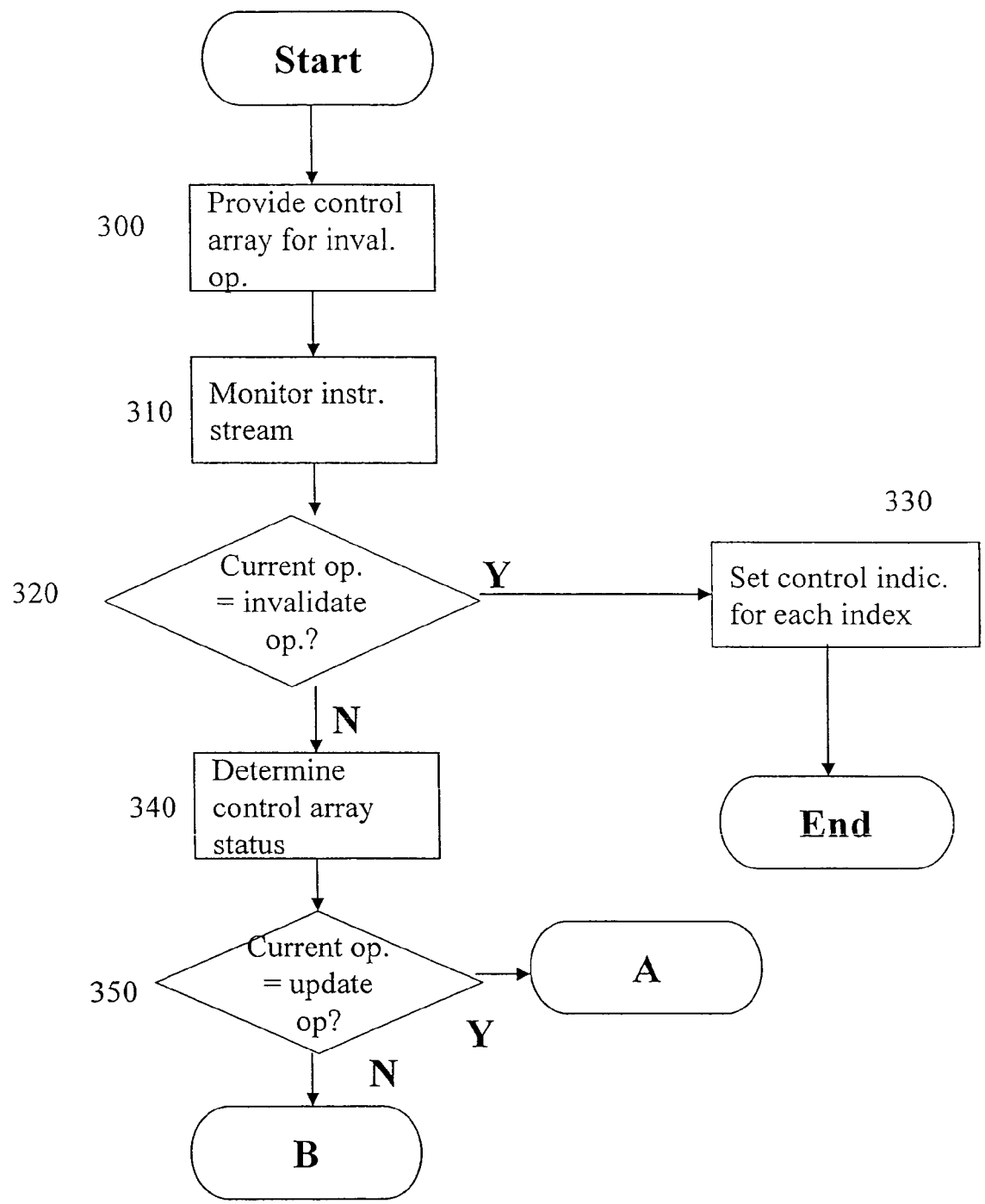
FIGS. 3a-3c are simplified flowcharts which together present a method for deferring cache memory invalidate operations, according to a preferred embodiment of the present invention.
Figure 3B:
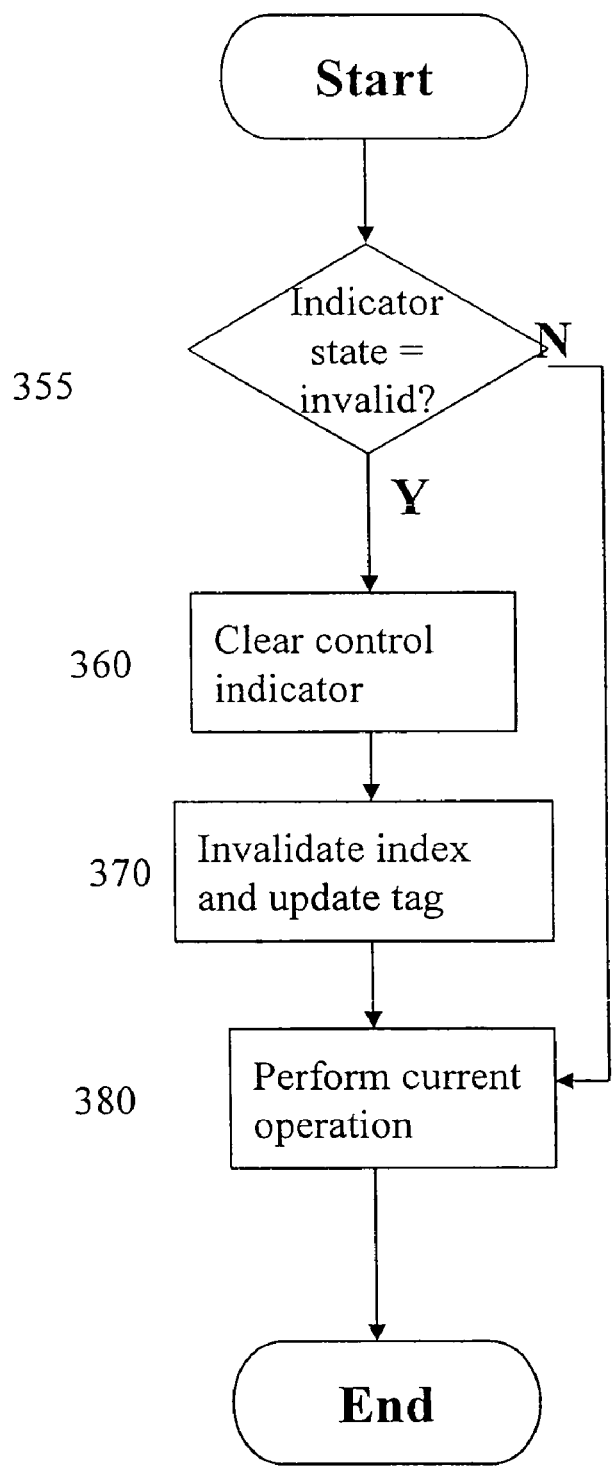
Figure 3C:
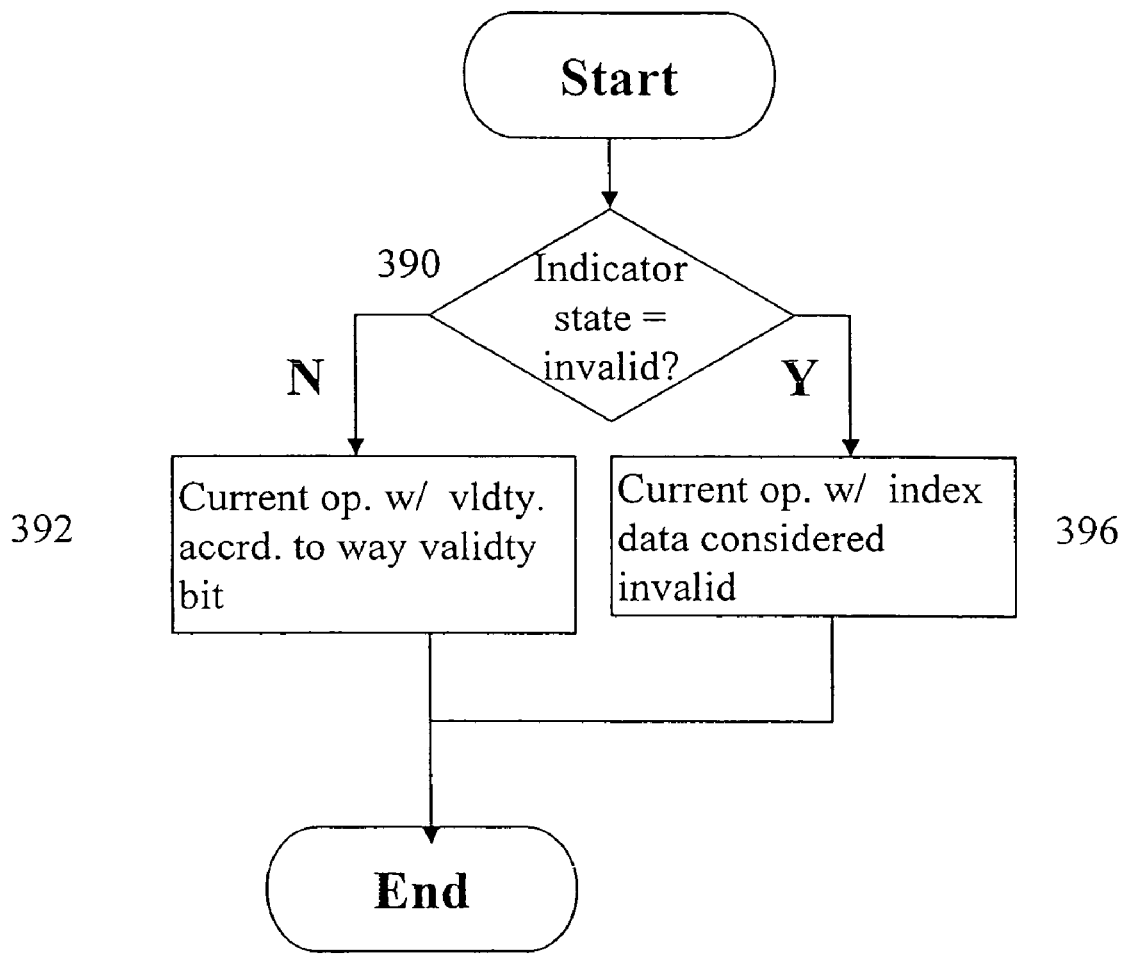

The method of updating is first described in general terms for FIGS. 2a-2c. FIGS. 3a-3c then present a specific embodiment of deferring a cache memory invalidate operation, in order to provide a more in-depth explanation of the method.

Reference is now made to FIG. 2a, which is a simplified flowchart of a method for updating a memory, according to a preferred embodiment of the present invention. The memory is a read/write memory. The memory can store multiple data items, with each data item stored at a respective memory location. Access to the memory is organized such that several data locations may be accessed simultaneously during a single memory access cycle. The memory location is commonly identified by a data address, or is specified as a way of a cache memory.

In step 200 a control array is set up. The control array is associated with a preselected type of memory update operation (designated herein the deferred operation type), and contains a local indicator giving the state of each commonly accessible group of memory locations. Some or all of the control array indicators are updated when a given memory operation is deferred. The local indicator states show whether or not the associated group of memory locations requires updating during a subsequent, routine memory access due to the deferral of a memory operation. The local indicator may be a dual-level indicator (i.e. an On/Off flag), or a multi-level indicator capable of indicating multiple states.

FIGS. 2-3 are described for embodiments where an indicator in the ON state indicates that a deferred operation is pending for the associated group, and that data stored in the group requires updating. A local indicator in the OFF state indicates that group data is up-to-date. However other the method is not limited to this type of indicator, and other embodiments are possible.

A commonly accessible group of memory locations is a group of memory locations which can be accessed during a single memory access cycle, and is generally determined by the access width to the memory. A commonly accessible group may be a single memory location (or way), a block of memory locations, a cache memory index, or a block of cache memory indices. If the memory is an n-way set associative cache memory, a group may contain the n ways of a cache memory index. Many of the embodiments presented below are particularly applicable to an n-way set associative cache in which a commonly accessible group of memory locations consists of the n ways of an index, however the method is applicable to other memory location groupings.

The control array can be implemented in several ways. The control array may be a separate register, or may be a component of the memory itself. For example, in a directly addressed memory a block of memory addresses may be dedicated to serve as the control array.

In step 210 the instruction stream to the memory is monitored to identify the current operation being sent to the memory, and a set containing one or more groups of memory locations on which the operation is to be performed (designated herein the specified groups). The groups may be specified explicitly (e.g. a memory block start and stop address), or may be implicit to the memory operation (e.g. reset entire cache memory). The memory locations affected by the memory operation may be a contiguous block of addresses (or indices), or a set of non-adjacent memory locations.

The execution of a single program instruction may require performing more than one operation on the memory. The order in which the operations are performed depends upon the memory operation being executed and the organization of the memory. For example, cache memory update instructions require a read operation to the cache to check for a cache hit, followed by a write operation to update the cache memory. Cache memory read instructions may also require both a read and a write operation. The cache memory is first read to determine if the required data is cached. In the case of a cache miss, data obtained from the main memory is then written to the cache memory.

The method continues at step 220, in which the current operation type is checked to determine if it is the deferred operation type. (A memory operation of the deferred operation type is designated herein a deferred operation, and an operation of any other type is designated herein a non-deferred operation.) If the current operation is a deferred operation, the control array is updated in step 230 by setting the states of the respective local indicators of the specified groups to show that the current operation has been deferred. For example, if the deferred operation type is the invalidate operation, the local indicator for each of the specified indices is set to ON. When an index having an invalidated local indicator is written to at a later time, the validity bits of the n ways of the index are set to invalid, and their tags are updated to prevent multiple hits during subsequent memory operations.

The control array may be updated as a whole, or only the affected local indicators may be updated. If the control array is updated as a whole, the local indicators of the specified groups are set to ON to indicate that the current operation has been deferred, and the remaining local indicators are reloaded with their previous states.

If it is determined in step 220 that the current operation is a non-deferred operation, the status of the control array is determined in step 240. The control array status incorporates the state of the local indicator of each of the specified groups. The control array status is commonly determined by reading the entire control array, but may be determined by reading only the local indicators of the groups specified in the current operation. Since the control array is small relative to the memory, determining the control array status generally requires a small number of read cycles.

In step 270 the current operation is performed upon each of the specified groups, in accordance with the group's respective local indicator. The state of the group's local indicator is used to determine whether or not the memory data is up-to-date, and if not, what is the correct value. If the group data is up-to-date the current operation is performed using the data stored in memory. If a deferred operation is pending, the current operation is performed using the data that would have been present in the memory had all deferred operations been performed on the group.

Performing the current operation may entail updating memory data. While a directly addressed memory generally has a single data field per memory location, a cache memory way has several fields, including a data field, a tag field, and various other fields containing cache control data. The particular field (or fields) which is updated is specific to the type of operation that is being deferred. For a cache memory, updating a group may entail storing a specified value in a data field, or setting or clearing a control bit. Additionally, updating a group may entail updating a single field for the entire group, or a separate field for each memory location within the group.

Some types of non-deferred update operations use the control array status to ensure that the update operation is performed correctly. For example, if the deferred operation is a cache memory lock operation, the local indicator state shows whether a lock operation to the associated index has been deferred. If a given index's local indicator is ON the data in all of the index's n ways is locked. Therefore, the control array state is checked prior to performing a non-deferred operation. If the local indicator associated with a given group of ways is locked, the data cached in the group of ways is not replaced, however the group's control fields may be updated. When a local indicator is in the ON state, the index's lock bits stored in the cache memory are not a reliable indicator of way status, since they have not yet been updated.

After the current operation is performed in step 270 the control array status may be incorrect. The control array may therefore need to be changed to reflect that the specified groups no longer have a deferred operation pending. Failure to update the control array may cause errors if memory data is updated more than once, or if a non-deferred operation is performed under incorrect assumptions. For example, for the invalidate operation, if a local indicator state is not set to OFF after the associated index's validity bits are updated, future read and update operations to the index will be made on the assumption that the stored data is invalid. This may cause errors if valid data has since been stored in the index.

Reference is now made to FIG. 2b, which is a simplified flowchart of a method for updating a memory, according to a preferred embodiment of the present invention. In the preferred embodiment, of FIG. 2b, the update method contains the further step of updating the control array status to reflect changes to the memory caused during the performance of non-deferred operations. Preferably the control array status is updated by clearing the respective local indicators of the specified groups. FIG. 2b is an extension of the method of FIG. 2a, with the addition of step 280 in which the control array status is updated as required by the current operation. The control array may be updated before or after the update operation to main memory, as required by implementation considerations.

In an alternate preferred embodiment, the control array status is not modified during a non-deferred memory update, but by a specific memory operation. For example, when the deferred operation is the disable operation, an index's local indicator may be cleared only by an enable operation to the given index.

In the preferred embodiment, a non-deferred update operation is performed upon a group of memory locations by first updating the group according to the group's local indicator state, and then performing current operation upon the updated group. Reference is now made to FIG. 2c, which is a simplified flowchart of a method for updating and reading a memory, according to a preferred embodiment of the current invention. Steps 200-240 are performed as described above. In step 250, the non-deferred operations are checked to determine if they are read operations or update operations. If the current operation is an update operation, the specified groups of memory locations are updated in step 260, and the current operation is performed upon the updated groups in step 270. However, if the current operation is a read operation, the current read operation is performed in step 290 on each of the specified groups in accordance with the state of each group's respective local indicator. The local indicator state is taken into account during the read operation to ensure that only up-to-date data is read from the memory. For example, if the deferred operation is a cache memory invalidate operation, the local indicator state is examined prior to reading data from any of the ways to determine if an index invalidate operation is pending. If the local indicator state is ignored, data may be read from an invalidated way.

Preferably, the method contains the further step of masking and/or unmasking portions of the control array. Masked portions of the control array are prevented from being updated. The control array portion may be a contiguous or non-contiguous set of indicators.

Preferably, the method contains the further step of resetting the control array. Control array reset can be useful during system initialization.

The above-described method of updating can be used to defer performance of a wide variety of memory update operations. The control array function of storing information to assist with later insertion of deferred data into the memory is similar for each of the operations, however the manner in which the control array status affects other memory access operations may differ.

Reference is now made to FIGS. 3a-3c which are simplified flowcharts collectively presenting a method for performing deferred invalidate operations to a cache memory, according to a preferred embodiment of the present invention. The method is presented for an n-way set associative memory, in which the ways of each index are commonly accessible (that is, a group of memory locations consists of the n-ways of each index). A local indicator is provided for each index. A local indicator in the ON state indicates that an invalidate operation to the given index has been deferred, and that the validity bits of the ways of the associated index have not yet been updated in the memory. When the local indicator is in the OFF state, the validity bits in the memory do not require updating. (To use a control array to invalidate each way individually, a local indicator is provided for each of the cache memory ways.)

Referring to FIG. 3a, in step 300 a control array is provided for the invalidate operation. The control array has a local indicator for each cache memory index memory. In step 310 the instruction stream to the memory is monitored. If it is found, in step 320, that the current operation is an invalidate operation, the local indicator for each index specified in the invalidate operation is set to the ON state in step 330. For all other read and update operations the control array status is determined in step 340, to learn the state of the local indicator for each specified index. The current operation is then checked in step 350 to determine whether it is an update or a read operation. If the current operation is an update operation, the steps shown in FIG. 3b (steps 355-380) are performed for each specified index. If the current operation is a read operation, the steps shown in FIG. 3c (steps 390-396) are performed for each specified index, as described below.

FIG. 3b illustrates how a non-deferred operation is performed upon a given index. In step 355 the state of the index's local indicator is checked. (The state of each local indicator is known as a result of step 340 in which control array status was obtained.) The local indicator is then set to the OFF state in step 360. Preferably, a single control array update is performed to update all the local indicators, rather than updating each local indicator individually. If the local indicator is in the ON state, the index data is brought up-to-date by setting the validity bits for all the ways of the index to invalid and the tags are updated to prevent multiple hits, in step 370. The current update operation is then performed to the index in step 380. (The control array may be updated before or after the update operation to the memory.) If the local indicator is in the OFF state, no change is made to the way validity bits before performing the current operation in step 380.

FIG. 3c illustrates how a read operation is performed upon a given index. In step 390 the index's local indicator state is checked. If the local indicator is in the OFF state, the read operation is performed in step 392, with the validity status determined by each way's validity bit. If the local indicator is in the ON state, the read operation is performed in step 396 as if the validity bit of each way were set to invalid, thereby ensuring that invalid data is not read from memory for those ways whose validity bits have not yet been updated.

In another preferred embodiment, the deferred memory operation is the lock operation. The control array contains a local indicator that indicates for each index whether a lock operation has been deferred. The control array is updated whenever a lock or unlock operation is performed. If the local indicator is in the OFF state, the way lock bits in memory are up-to-date, and accurately show whether the way is locked or not. The ON state indicates that a lock operation has been deferred, and that all the ways in the index should be considered locked. The lock bits are updated in memory during subsequent update operations to the index. Non-deferred update operations check the control array status before modifying cache memory data, and are not performed for any index whose local indicator shows the index to be locked. The control array status may also affect the performance of read operations, in which a cache read miss requires storing new main memory data in the cache memory.

In an additional preferred embodiment the deferred memory operation is the disable operation. For the disable operation, the control array contains a local indicator that indicates for each index whether a disable operation has been deferred. The control array is updated whenever a disable or enable operation is performed. If the local indicator is in the OFF state, the way disable bits in memory are up-to-date, and accurately show whether the way is disabled or not. The ON state indicates that a disable operation has been deferred, and that the index should be considered disabled.

The memory operations discussed above are relevant for an n-way set associative memory. However the present method is not limited to cache memories. In yet another preferred embodiment, the deferred operation is a data load operation, which stores a single value or a specified pattern of values in the memory. The current embodiment may serve to initialize a block of addresses in a standard directly addressable memory, or to store values in the data field of the ways of a cache memory. When the load operation is deferred, the local indicator for each of the specified groups is set to ON. When a non-deferred operation is subsequently performed, the local indicator states are checked for all of the specified groups, and the required value or values stored for those groups whose local indicator is in the ON state. The local indicators of the specified groups are then set to OFF, so that a group is not updated twice. During a read operation, the control array status is checked to see if an operation has been deferred for any of the specified groups, and the required value used for those groups for whom the local indicator is set to ON. The value or pattern of values may be predetermined, or may be a variable specified in the current operation or in a register. If the local indicator is clear, the read operation returns the value stored in the memory. The local indicator may be a multi-level indicator, where each state indicates a different value to be stored in the group, or to specify a separate value for each location in the group.

As the skilled person will appreciate, the above method of updating is adaptable to other memory operations by proper definition of the control array, and appropriate handling of memory access operations for different indicator states.

In some cases it may be desirable not to defer the memory operation, but to update the specified groups immediately. The preferred embodiment therefore contains the further step of performing an immediate update to the specified groups in addition to updating the control array, for selected occurrences of the deferred operation. In a further preferred embodiment, an immediate update is performed whenever the number of groups specified in the operations is fewer than a given threshold.

In some cases power considerations and/or other system constraints may prevent updating the entire control array in a single cycle. The abovedescribed method can be extended to update the entire control array, and consequently the entire memory, in a single cycle. The extended method essentially applies the original method to the control array itself, by providing an array of global indicators, which is used to update the control array similarly to the way that the control array is used to update the memory. The local indicators are subdivided into groups, and a global indicator is provided for each of the local indicator groups. The number of local indicators in each group may be selected to ensure that the global indicator array is updatable in a single cycle. In order to set a given group of local indicators, the global indicator associated with the local indicators is set. The local indicators are subsequently updated to the correct value. Non-deferred operations check the states of both the local and global indicators before the operation is performed. A further array, the pending array, is an array of pending flags. A pending flag is provided for each local indicator, and is used to determine whether or not a given local indicator should be updated from its associated global indicator.

Figure 4:
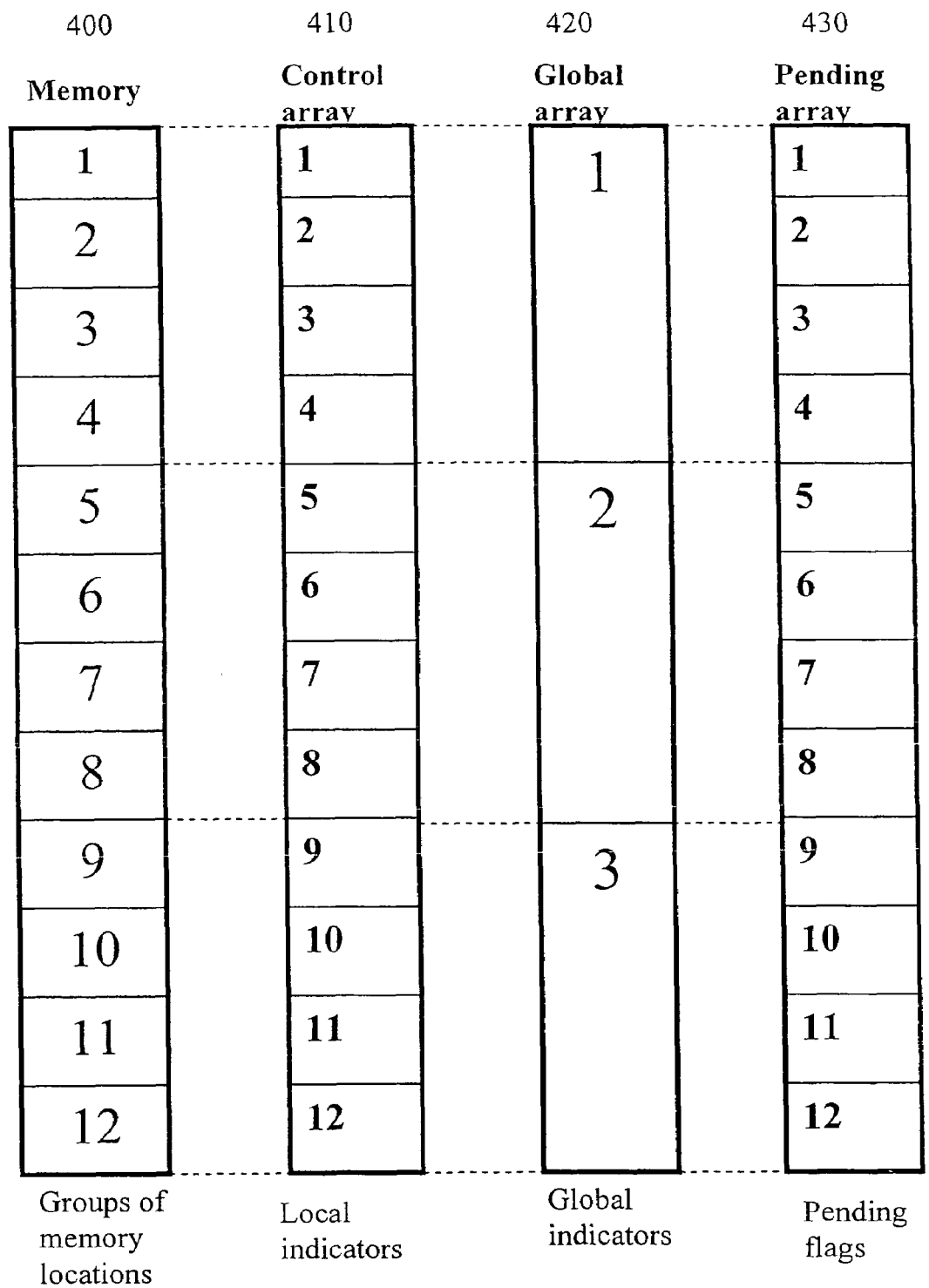
FIG. 4 shows the relationship between the memory and the control, global, and pending arrays.

Reference is now made to FIG. 4, which illustrates the relationship between the memory 400, the control array 410, the global indicator array 420, and the pending array 430. FIG. 4 shows an example in which memory 400 has twelve groups of memory locations. Control array 410 contains twelve local indicators, with a local indicator provided for each group of memory locations. The local indicators are sub-divided into groups of four, and a global indicator is provided for each group of local indicators. Global array 420 therefore contains three global indicators. Pending array 430 contains twelve pending flags, with a pending flag provided for each local indicator. A memory location is thus provided with a respective local indicator, a respective pending flag, and is associated with a global indicator.

Figure 5:
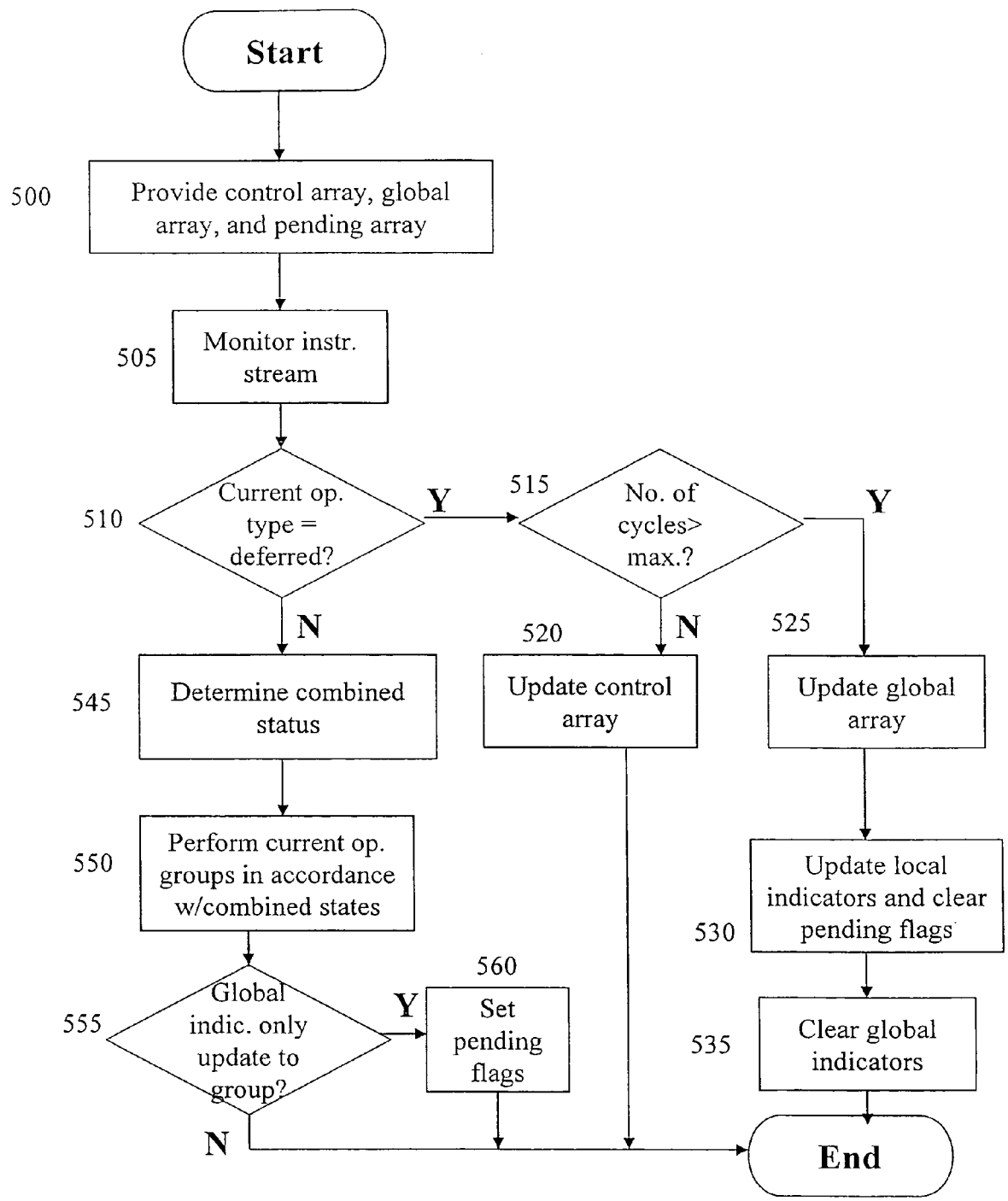
FIG. 5 is a simplified flowchart of a method for updating a memory, according to a preferred embodiment of the present invention.

Reference is now made to FIG. 5, which is a simplified flowchart of a method for updating a memory according to a preferred embodiment of the present invention. As discussed above, the memory is a read/write memory, where access to the memory is organized such that several data locations may be accessed simultaneously during a single memory access cycle. The current preferred embodiment uses the global array to defer an operation only if the number of groups on which the operation is performed is large, so that updating the local indicators directly is problematic. When fewer groups are affected, the operation is deferred using the control array. Note that use of the global indicators is possible under other conditions as well, with a modification of the criteria used to select which array is used for the current operation.

In step 500 three arrays are established. The first array is the control array, which is associated with a preselected type memory update operation (designated herein the deferred operation type), and contains a local indicator giving the state of each commonly accessible group of memory locations. The second array established is the global array, which provides a global indicator for each group of local indicators. The global indicator is used to indicate the state of the associated group of local indicators, and thereby to defer an update operation to the respective memory locations. A third array, the pending array, contains a flag (denoted the pending flag) for each local indicator respectively.

The pending array is used to control data propagation from the global array to the control array. For a given local indicator, the pending flag is set to ON when the respective memory location is updated from the global indicator. A set pending flag indicates that a clear operation is pending to the associated local indicator. The global indicator is not cleared until all the associated local indicators are updated, which generally requires several cycles. A local indicator whose pending flag is set does not require updating from the associated global indicator, since the memory data has already been brought up-to-date. Updating a local indicator whose pending flag is set will cause the deferred data to be reloaded into memory, even if the data is no longer current due to a subsequent memory operation.

FIG. 5 is described for embodiments where a local indicator in the ON state indicates that a deferred operation is pending for the associated group of memory locations. Likewise, a global indicator in the ON state indicates that the propagation of the global indicator state to the associated group of local indicators has not yet been completed (that is, the associated local indicators have not yet been set to ON). A pending flag in the ON state indicates that the respective memory location has been updated from a global indicator, but that the associated local indicator has not yet been cleared. However the method is not limited to these types of indicators, and other embodiments are possible.

In step 505 the instruction stream to the memory is monitored to identify the current operation being sent to the memory, and the specified memory locations on which the operation is to be performed. The operation type is checked in step 510, to determine if the current operation is a deferred operation. If the current operation is a deferred operation, a further check is performed in step 515 to determine whether the global array or local array should be updated. In the preferred embodiment, the criterion used to make this determination is the number of time cycles required to update the local indicators individually. If the number of cycles is not exceeded, the method is performed in step 520 as previously described, by updating the local indicators of the specified groups. However, if the specified number of cycles is exceeded, deferral of the current operation is performed by updating the global indicators. In step 525 the global array is updated by setting the global indicators of all of the specified groups to ON. Note that when the global array is used the local indicators are not settable individually, but rather in groups. Instruction processing continues after the global indicators have been updated.

In step 530 the control array is updated in accordance with the states of the global and pending arrays, and the pending flags are cleared as necessary (see below). The control array update is performed without disrupting instruction processing. Preferably, the local indicators are updated during subsequently required accesses to the control array, much in the way the memory is updated according to the control array state in the previously described embodiments.

In contrast with the previous embodiments, the local indicators associated with a global indicator are not commonly accessible, so that updating all the local indicators generally requires several cycles. An individual local indicator may therefore be cleared (when the respective memory location is updated) before the entire group of local indicators is updated from the global indicator. A mechanism is therefore required to determine, for those local indicators whose global indicator is ON, whether the local indicator state is up-to-date or awaiting updating from the global indicator. The pending array provides this mechanism. If a group of memory locations is updated due to a globally deferred operation (i.e. the global indicator is ON) but before the respective local indicator has been set by the global indicator, the respective pending flag is turned ON (steps 555-560 below). A pending flag in the ON state indicates that the group's memory data has already been updated, even though the associated global indicator is still set, and that a clear operation is pending to the local indicator. The pending flag is checked before a local indicator is updated from a global indicator, and the local indicator is set to ON only if the respective pending flag is OFF.

In the preferred embodiment, the pending flags of all the associated local indicators are cleared when a global indicator is set to ON during a subsequent globally deferred operation, even if all the associated local indicators have not yet been updated.

An update is required to the state of a given local indicator only if the associated global indicator is set (an operation has been deferred via the global array) and the respective pending flag is clear (main memory data not is not yet updated). In the preferred embodiment, a local indicator is updated by copying the inverse of the respective pending flag into the local indicator, if the associated global indicator is set. If the associated global indicator is clear, the local indicator state is not changed.

In the preferred embodiment, only those local indicators whose associated global indicator is set are updated from their global indicator. If the entire local array is updated, those local indicators whose global indicator is clear are reloaded with their previous state.

In step 535, the global indicator is cleared. In the preferred embodiment, the maximum time (number of cycles) required to update the local indicators from their associated global indicator is known, and the global indicator is cleared a given number of cycles after being set.

If, in step 510, it is found that the current operation is not a deferred operation, the control, global, and pending arrays are checked in step 545. A decision is made whether a given memory location requires updating based on the combined state of the local indicator, global indicator, and pending flag associated with the memory location. In the preferred embodiment, the memory location requires updating if the pending flag is OFF, and the global and/or the local indicator are ON (that is Pending AND (Global OR Local)). In step 550 the current operation is performed on each of the specified groups of memory locations in accordance with the group's combined state.

In step 555 a decision is made for each of the specified groups, whether or not to set the respective pending flag. The pending flag is set in step 560, for those groups that are updated due to state of their associated global indicator, but whose respective local indicator has not yet been turned ON by the associated global indicator.

Figure 6:
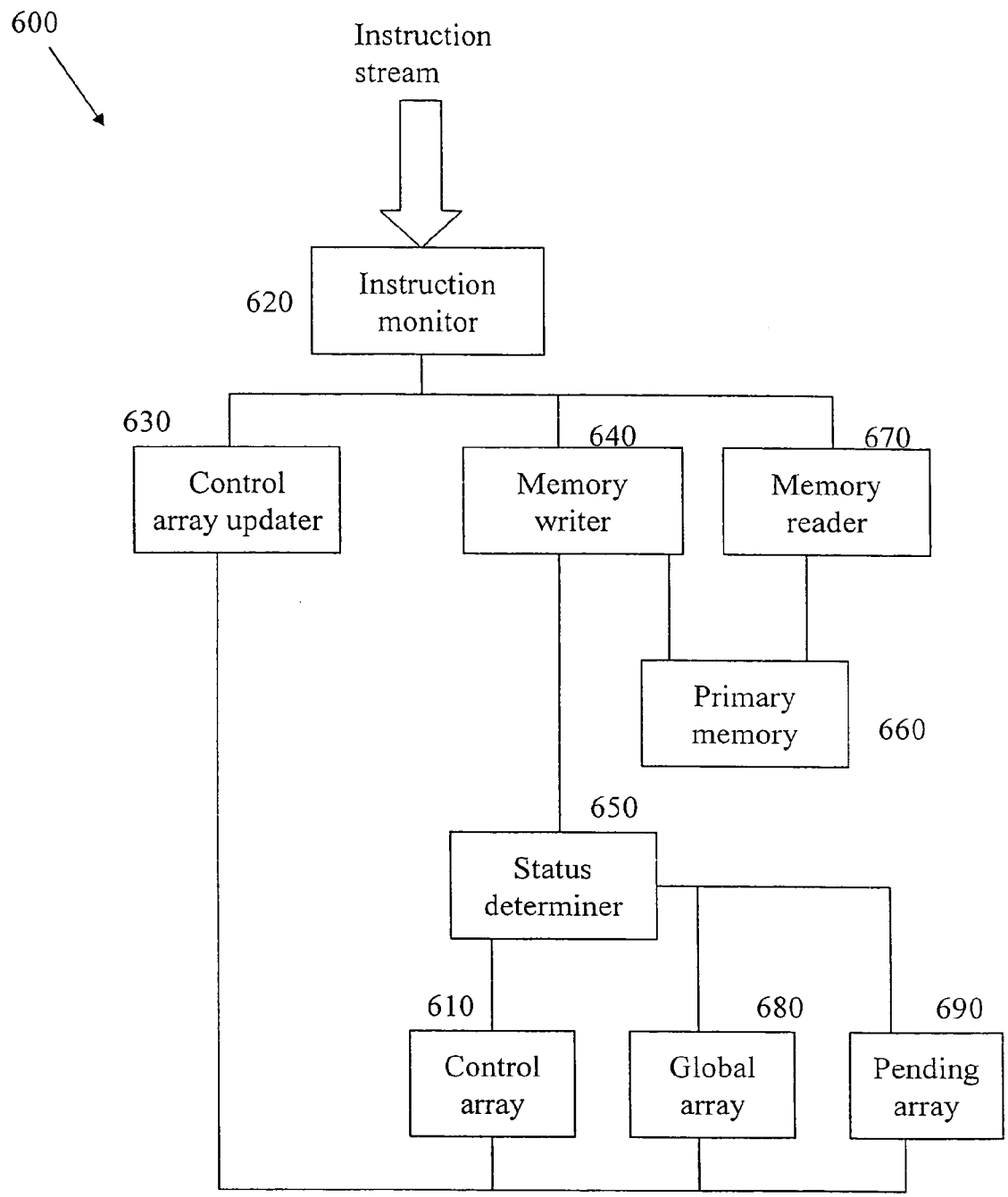
FIG. 6 is a simplified block diagram of a memory updater, according to a preferred embodiment of the present invention.

Reference is now made to FIG. 6, which is a simplified block diagram of a memory updater, according to a preferred embodiment of the present invention. Memory updater 600 consists of control array 610, instruction monitor 620, control array updater 630, memory writer 640, and status determiner 650. The control array 610 has a local indicator for each commonly accessible group of memory locations of a memory 660 respectively, and is associated with a particular type of update operation (the deferred operation type) as described above. Memory 660 may be a component of memory updater 600, or may be an external memory. Memory 660 may be a cache memory.

Instruction monitor 620 monitors the instruction stream to the memory to determine the type of the current memory operation, and the groups specified in the current instruction. If the current operation type is the same as the deferred operation type, control array 610 is updated by control array updater 630, and memory 660 is not accessed. Preferably, control updater 630 updates control array 610 in its entirety, however it may update selectable portions of the control array 610.

Memory writer 640 performs memory update operations of types other than the deferred operation. When instruction monitor 620 detects a non-deferred memory update operation, the control array status is read by status determiner 650, to determine the state of the local indicator associated with each of the specified groups. Memory writer 640 updates each of the specified groups in accordance with the control array status, and performs the current operation upon the updated groups. When the memory is a cache memory, control array writer 640 may update a data or a control field, depending on the type of operation being deferred. If necessary, memory writer 640 activates control array updater 630, to ensure that control array 610 accurately reflects the contents of the memory 660 after the current operation has been performed.

Preferably, memory updater 600 further contains memory reader 670, which handles memory read operations. Memory reader 670 performs a read operation on each specified group of locations, while taking the state of the group's local indicator into account.

Different types of memory access operations are handled by different memory updater components. Instruction monitor 620 preferably contains an update manager which forwards the current operation to the appropriate component, depending on the operation type. Deferred operations are forwarded to control array updater 630. Non-deferred operations are forwarded to memory writer 640. Read operations are forwarded to memory reader 670.

Preferably the deferred operation type is one of the following types of operations: a data update operation to store a pattern of values in memory, a cache memory invalidate operation, a cache memory lock/unlock operation, or a cache memory disable/enable operation.

In the preferred embodiment, a second control array is provided for a second deferred operation. The control array updater 630 is connected to both control arrays, and updates the appropriate array for a given deferred operation. Status determiner 650 may provide the status of each control array independently, or of both jointly.

In the preferred embodiment, memory updater 600 further contains a global array 680 and a pending array 690. Global array 680 consists of global indicators, each global indicator being associated with a group of local indicators. Setting a global indicator is equivalent to setting all of the local indicators associated with the global indicator.

Pending array 690 contains a pending flag for each local indicator. The pending flag for a local indicator is set by control array updater 630 when the respective group of memory locations is updated due to a globally deferred operation, before the local indicator has been updated from the global indicator. In the preferred embodiment, a respective pending flag is set when updating a group of memory locations for which the associated global indicator is set and the respective local indicator is clear. A pending flag set to ON indicates that a clear operation to the local indicator is pending.

In the preferred embodiment, instruction monitor 620 determines for a deferred operation whether the local or global array will be updated. Control array updater 630 updates the three arrays, the control array 610, global array 680, and pending array 690. Status determiner 650 determines the state of all three arrays, and processes the states of the three arrays to generate a combined state. The combined state is used by memory writer 640 and memory reader 670 to perform update and read operations to primary memory 660.

The memory update method and apparatus described above enable quick, updates to large areas of memory. The control array provides a mechanism for a performing rapid memory updates to large blocks of memory. Instruction processing proceeds correctly, even before the actual data stored in the memory has been updated. Instead of requiring many update cycles, a large-scale memory update may require only a single update to the control array. The timesavings are particularly significant for any memory which undergoes large-scale updates frequently, such as a cache memory. The memory update consumes relatively little power, since it is accomplished in a small number of update cycles.

It is expected that during the life of this patent many relevant memories, cache memories, memory mappings, and memory operations will be developed and the scope of the terms memory, cache memory, memory mapping, and memory operation are intended to include all such new technologies a priori.

As used herein the term "about" refers to ±10%.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method for updating a memory, said memory comprising multiple locations for data storage, said memory locations being groupable into commonly accessible groups, said method comprising:

providing a control array for said memory, said control array being associated with a first predetermined type of update operation, and having a respective local indicator for each of said commonly accessible groups of memory locations;

monitoring an instruction stream to said memory for a current memory operation and a set of groups upon which said current operation is to be performed;

if a type of said current memory operation comprises said predetermined type, deferring said current operation and updating said control array;

if said type of said current operation comprises an operation other than said first predetermined type:

determining from the control array a state of the respective local indicator of each group of said set, and performing said current operation upon each group of said set in accordance with said state of said respective local indicator of said group; and if said current memory operation comprises said predetermined memory operation and a number of groups of said set is less than a predetermined threshold, performing said current operation upon each group of said set.

2. A memory updater, comprising:

a memory;

a control array, said control array being associated with a first predetermined type of memory write operation and having a respective local indicator for each commonly accessible group of memory locations of the memory;

an instruction monitor, for monitoring an instruction stream to said memory to determine a current memory operation type and a set of groups upon which said current operation is to be performed;

a control array updater associated with said instruction monitor and said control array, for deferring said current memory operation and updating said control array when a type of said current operation comprises said first predetermined type;

a state determiner associated with said control array, for determining from the control array the state of the respective local indicator of each group of said set;

a memory writer associated with said memory, said instruction monitor, and said state determiner, for implementing types of memory write operations other than said predetermined operation type, by updating each group of said set of groups in accordance with a state of a respective local indicator of said group, and by causing a processor to perform said current operation upon said updated groups; and a global array having a global indicator for each group of local indicators respectively.

3. A memory updater according to claim 2, further comprising a pending array having a pending flag for each of said local indicators respectively.

4. A memory updater according to claim 3, wherein said control array updater is further operable to update said global array and said pending array.

5. A memory updater according to claim 3, wherein said state determiner is operable to determine a combined state from said control array, said global array, and said pending array.

6. A memory updater according to claim 5, wherein said memory writer is operable to update a group of said set of groups in accordance with said combined state.

7. A memory updater according to claim 5, further comprising a memory reader for performing a read operation on each group of said set of groups in accordance with said combined state.

8. A method for updating a memory, said memory comprising multiple locations for data storage, said memory locations being groupable into commonly accessible groups, said method comprising:

providing a control array for said memory, said control array being uniquely associated with a predetermined type of write operation, and having a respective local indicator for each of said commonly accessible groups of memory locations;

providing a pending array for said memory, having a respective pending flag for each of said local indicators;

grouping said local indicators;

providing a global array for said memory, having a respective global indicator for each group of local indicators;

monitoring an instruction stream to said memory for a current memory operation and a set of groups of memory locations upon which said current operation is to be performed;

if a type of said current memory operation comprises said predetermined type,
  (1) deferring said current memory operation,
  (2) selecting between a global update and a local update according to a predetermined selection rule,
  (3) if a local update is selected, updating said control array, and
  (4) if a global update is selected,
    (a) updating said global array, and
    (b) for each of said global indicators,
      (i) for each of said local indicators associated with said global indicator, updating said local indicator in accordance with a state of said global indicator and of said respective pending flag and clearing said respective pending flag, and
      (ii) clearing said global indicator; and if said type of said current operation comprises an operation other than said predetermined type,
        (1) determining a combined state of said group's respective local indicator, respective pending flag, and associated global indicator; and
        (2) performing said current operation upon said group in accordance with said combined state;
wherein updating a local indicator in accordance with said global indicator and pending flag states comprises, storing an inverse of said pending flag state in said local indicator, if said global indicator is set.

* * * * *